United States Patent [19]

Cherfane

[11] Patent Number: 5,246,143
[45] Date of Patent: Sep. 21, 1993

[54] THERMAL INSULATION GRADE FOAM DISPENSING SYSTEM

[75] Inventor: Raymond Cherfane, Stone Mountain, Ga.

[73] Assignee: Flexible Products Company, Marietta, Ga.

[21] Appl. No.: 871,988

[22] Filed: Apr. 22, 1992

[51] Int. Cl.$^5$ .............................................. B67D 5/60
[52] U.S. Cl. .................................. 222/145; 222/148; 222/389
[58] Field of Search ................ 222/145, 148, 504, 389; 239/114, 118, 123

[56] References Cited

U.S. PATENT DOCUMENTS

| | | | |
|---|---|---|---|
| 4,471,887 | 9/1984 | Decker | 222/149 X |
| 4,568,003 | 2/1986 | Sperry et al. | 222/145 |
| 4,867,346 | 9/1989 | Faye et al. | 222/145 |
| 4,899,912 | 2/1990 | Pontius et al. | 222/149 X |
| 4,901,888 | 2/1990 | Standlick | 222/145 |
| 5,027,975 | 7/1991 | Keske et al. | 222/149 X |
| 5,104,006 | 4/1992 | Brown | 222/145 |
| 5,163,584 | 11/1992 | Huber et al. | 222/148 |
| 5,180,082 | 1/1993 | Cherfane | 222/145 |

*Primary Examiner*—Kevin P. Shaver
*Attorney, Agent, or Firm*—Lockwood, Alex, FitzGibbon & Cummings

[57] ABSTRACT

A solventless, flushless hand held impingement mixing and dispensing gun for dispensing controlled quantities of a controlled thermal insulation grade reactive chemical foam composition is provided. The dispenser gun preferably includes a unitary socket member mounted to the gun body having a receptacle portion for receiving an extended service life impingement mixing and dispensing module. A converter subassembly is provided to convert variable pressure and flow rate streams of the chemical components into regulated controlled pressure metered flow rate chemical component flows for introduction to the opposed sides of the impingement mixing dispenser gun. In accordance with the invention, the controlled pressure, metered flow rate streams of components are gradually repressurized prior to entering side orifices leading to the impingement mixing chamber of the dispenser module to provide balanced pressure approach needed to consistently and reproducibly provide high quality thermal insulation grade foams of known composition and physical properties. The extended service life dispenser module includes a valving assembly employing a valving rod of hardened tool steel and scraper members to effectively reduce or eliminate foam build up induced module failures. In the preferred embodiment, high powered, double acting multi-piston air cylinder activator for controlling movements of the valving rod and an air purge foam propulsion delivery system are also provided.

27 Claims, 8 Drawing Sheets

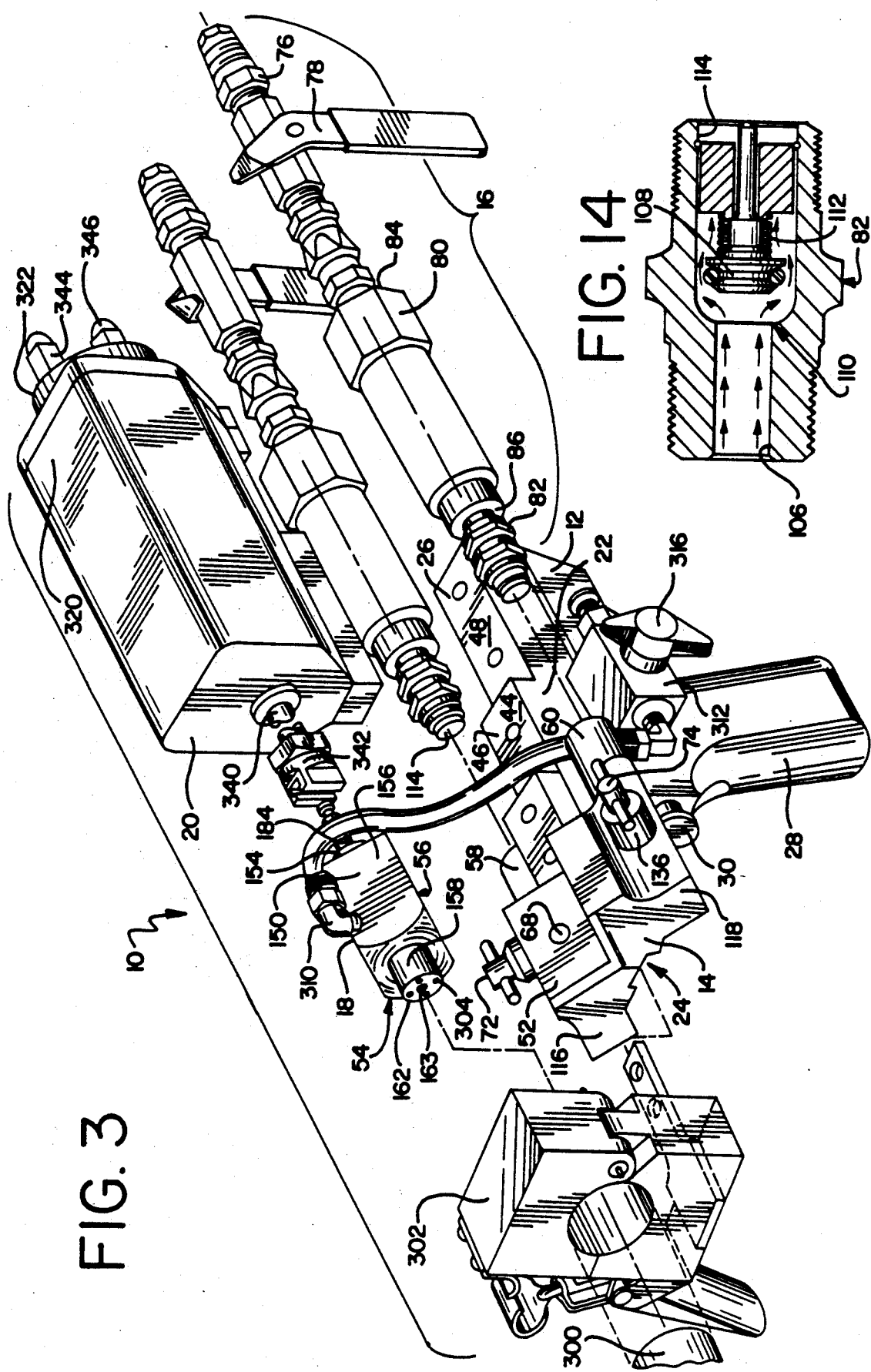

THERMAL INSULATION GRADE FOAM DISPENSING SYSTEM

BACKGROUND OF THE INVENTION

The present invention generally relates to dispensing system for making, mixing and dispensing reactive chemical foam compositions for a number of end use applications. More particularly, it relates to a new and improved hand held gun and solventless dispensing system for consistently and repeatedly mixing and dispensing substantially uniform thermal insulation grade polyurethane foams characterized by extended, substantially leak-free service life.

Reactive chemical foam compositions, such as curable polyurethane foams, are presently well known and used in a number of different applications. The curable foam compositions typically comprise a two-part composition and, in the case of polyurethane foams, one part of the composition includes a polyol component and the other part includes an isocyanate component. Chemical foaming agents, curing agents, catalysts or accelerators, as well as other modifying additives, may be incorporated in one or both of the component parts. These two-parts of the foaming composition are separately stored in different containers until use.

For use, the two parts of the composition are rapidly mixed together. A rapid cross linking reaction and foam expansion commences which ultimately yields a low density, but relatively high load bearing urethane rigid foam. Expanding chemical foams are useful in such applications as thermal insulation, in floatation, in coatings and, more recently, the foams have been used in the specialty packaging industry. In the thermal insulation field, the dispensed cured foam must reflect certain desired thermal insulation values and other physical properties. The precise insulation value (K factor) imparted by the foam is directly dependent on the exact chemical composition of the dispensed foam. The mixing of the polyol and isocyanate components must occur at a proper flow ratio and mix under rapid and sufficient impingement mixing conditions for a final acceptable product to be obtained. In the past, particularly in the precise field of building thermally insulated containers for refrigeration units or shipping containers, foam components were dispensed using static mixing equipment. The static mixers relied upon dangerous organic solvents such as methylene chloride to rinse and flush the dispensers in use. Nowadays the environmental hazards of using these solvent materials renders static mixers no longer suitable for commercial thermal insulation contexts.

More recently, the urethane components including the resin or polyol component and the isocyanate component are stored under pressure in containers which are attached to solventless hand held impingement mixing and discharge guns by means of various hoses and couplings. The guns include a trigger operated dispenser valve designed to permit the two-parts of the composition to flow through the hoses and into a mixing chamber wherein the products are rapidly mixed to form a reactive and expanding chemical foam composition which exits through a foam discharge nozzle or opening. In prior art guns, the component delivery systems extending from the pressurized storage tanks into the dispenser module of the gun are typically multipart systems and the potential for leakage at every joint therealong exists in the high pressure impingement mixing environment.

In these dispensing guns, the components are mixed by direct or indirect impingement with each other under conditions of high pressure to ensure thorough mixing. The design of the discharge valves and nozzles has become a matter of concern in the art. The component parts of the foam composition are highly chemically reactive and begin to form cured polymeric products within a matter of seconds. Premature leaking and mixing of the components within the dispensing nozzles is a serious and major concern because leakage results in undesirable curing in the nozzle causing blockage and damage to the nozzles in use. As a result, the nozzles have to be frequently replaced at considerable expense. Providing adequate seals within the nozzle assemblies in the high pressure environment has been another major problem to those in the art.

Prior art foam dispensing guns are known, for example, from U.S. Pat. No. 4,469,251, U.S. Pat. No. 4,568,003 U.S. Pat. No. 4,993,596 and from copending application Ser. No. 777,802, filed Oct. 17, 1991, now U.S. Pat. No. 5,180,082. In accordance with these prior dispensing gun arrangements, a detachable dispensing module includes a mixing chamber defined in a central bore within a polymeric insert. Typically, the polymeric insert is formed of a TEFLON ® material because the reactive foam composition and its components are not adherent to the TEFLON ® surfaces along the interior of the bore.

More particularly, the TEFLON ® insert has a central bore extending longitudinally therethrough. A plurality of openings extend through a sidewall of the insert in communication with the bore for supplying organic resin and the isocyanate components into the mixing chamber. A valving rod is provided in a slidable interference fit within the bore to control the flow of organic polyol resin component and isocyanate component from the side openings into the mixing chamber and discharge of the foam therefrom. Although the inserts exhibit non-adherent surface characteristics, TEFLON ® materials are notorious for suffering from hysteresis or cold flow dimensional instability. Cold flow of the TEFLON ® material causes a distortion or a change in the critical dimensions of the central bore and the side openings of the insert. Over time this often results in a loss of the interference fit between the valving rod and the insert. More particularly, with each activation of the valving rod, a minor film of foam product and components coats the rod. As the coating builds up on the rod, the effective diameter of the rod increases. The foam build up on the rod increases the stresses on the insert in use, leading to cold flow deformation, loss of tolerances and a loss of sealing between the rod, the core aperture and the side openings in the dispenser module. This results in cross-over contamination and blockage failures in the gun. As a result, the ability of the valving rod to effectively seal the openings to thereby prevent leakage of the reactive components into the mixing chamber is lost. Cross-overs, blockage and leakage ultimately cause obstruction within the mixing chamber which renders the dispensing module generally inoperable.

In an effort to overcome the tendency of the valving inserts to undergo cold flow deformation with a consequent loss in sealing and usefulness, conventional dispenser cartridges or modules have been provided with means for applying a constant axial and radial compressive load against polymeric insert member. Applying constant radial and axial loads on the insert tends to reduce some of the cold flow induced failures of the prior art nozzles. Applying a constant radial and axial load increases frictional forces developed between the valve insert and the valving rod which tends to increase the residual stresses on the insert responsible for cold forming. Presently, the frequency of failure is still undesirably high in view of the expense associated with replacement and repair of the mixing chamber/dispensing modules. For example, a typical commercial impingement mixing hand held foam gun may generally only be subjected to approximately 2,000 to 3,000 dispensing activation cycles before module failure is experienced. More importantly, the prior art impingement mixing guns and dispenser systems are not presently capable of consistently providing the repeatable controlled flow of component materials required to consistently meet the narrowly drawn thermal insulation rating performance criteria for modern thermal insulation uses.

Accordingly, to overcome the disadvantages of the prior art dispensing guns, it is an object of the present invention to provide a new and improved foam dispensing gun including a dispenser module characterized by prolonged or extended use lives of more than 20,000 activation/dispense cycles.

It is another object of the present invention to provide a new and improved solventless, flush-free dispenser system for thermal insulation grade foam dispensing applications.

It is a further object of the present invention to provide a new and improved hand held dispenser gun including flow controlling means to provide precise chemical metering in conjunction with matched pressure-balancing dispensing modules having carefully specified dimensions for thorough mixing to afford reliable dispensing of substantially uniform thermal insulation grade foam products.

It is another object of the present invention to provide a new and improved dispenser gun for foam compositions including new and improved unitary socket members to reduce possibility for leakage in use.

It is still a further object of the present invention to provide a new and improved foam dispensing gun including a unique cartridge mixing chamber to assure product consistency at various selected pounds per minute throughput values.

It is a further object of the present invention to provide a double acting, double power air-cylinder actuator system for moving the valving rod between its open and closed positions.

It is still another object of the present invention to provide a new and improved dispenser module for a foam dispensing gun adapted to receive a forward foam discharge guide including means for introducing a blast of air under pressure into the discharge guide behind a slug of dispensed foam to urge substantially all of the dispensed foam out of the discharge guide, to thereby purge the guide for the next shot of dispensed foam.

SUMMARY OF THE INVENTION

In accordance with these and other objects, the present invention provides a new and improved hand held gun for dispensing thermal insulation grade reactive chemical foam compositions. The new and improved foam dispenser gun comprises, in combination, a gun body including a handle. A unitary socket member mountable onto said gun body is provided including a dispenser module receptacle portion having a pair of spaced and opposed component exit ports. The socket member also includes a pair of opposed component entry ports spaced from said receptacle portion. A pair of spaced and opposed chemical component passageways are defined in said socket member, each passageway extending between and interconnecting a component entry port to a component exit port. In accordance with the invention, the gun further includes a removable dispenser module having a front end surface with a foam dispense opening. The dispenser module also includes a rear end surface having a rod-receiving opening and an elongate central core aperture extending therethrough between said foam dispense opening and said rod-receiving opening. A pair of side openings are also provided into the dispenser module. The dispenser module further includes an elongate valving rod having a forward end portion slidably and sealingly engaged in the core aperture of the dispenser module. The valving rod is movable between a forward, closed position wherein the forward end portion extends within the foam dispense opening and along the length of the core aperture and a retracted, open position wherein the forward end portion is spaced rearwardly from the foam dispense opening and the side openings thereby permitting chemical components of the reactive chemical foam composition to flow through said component exit openings in the socket member, through the side openings, into said core aperture for impingement mixing and thereafter, out through said foam dispense opening of the module.

In accordance with a first aspect of the invention, the one-piece, unitary socket member provides distinct advantages over prior art gun-mounted, cartridge-receiving fixtures. The one-piece socket design eliminates the need for at least two separately sealed interfaces, one for each component after entering the socket member. In prior art arrangements, the mounting member included a component entry port into a valving block, an O-ring sealed interface between a valving block exit aperture and an entrance opening in the module-receiving portion of the fixture and another sealed interface between the receptacle openings in the fixture and component entry openings into the dispenser module, one on each side of the gun for each of the two components of the foam composition. The unitary socket member of the present invention eliminates the intermediate sealed interface on each side of the gun. Experience has shown that in the high pressure environment undesirable leakage due to seal failure frequently occurs at this intermediate interface, which is now avoided by the present arrangement. Moreover in addition to reducing costs by eliminating the need for several seals, the unitary socket member provides the further advantage of reducing the total number of parts required to be properly aligned assembled and mounted which saves time and makes the gun more convenient to set up, maintain and use.

In accordance with the present invention, a hand held impingement mixing gun may now be used to provide accurate, reproducible shots of substantially uniform, high quality, thermal insulation grade foam compositions by providing a means for converting the variable pressure, variable flow sources of the foam components which are generally commercially available for less restricted foam uses into the carefully controlled and metered flows of materials necessary to provide consistent component ratios and thorough product mixing required to dependably provide standard quality grade foam materials having guaranteed physical properties. More particularly, and by way of illustration, a manufacturer of a refrigerator appliance or a temperature controlled shipping container, frequently assembles most of the parts of the device together. Thereafter, as one of the final steps in manufacture, a layer of uniform foam having proper density and K-factor values is injected into the sidewall structures of the container. If the foam does not meet specifications, the entire article has been compromised. In the thermal insulation field, therefore, foam dispensing injection guns must provide their user with a guaranteed assurance that every time that trigger is pulled or activated, a known quantity of a high-grade foam of known quality is being dispensed. It is largely for these reasons that prior art hand held dispensing guns and foam dispensing systems have been considered too sloppy, too variable and too inconsistent to be used in commercial thermal insulation applications.

In accordance with this important aspect of the present invention, the gun dispenser systems additionally include converter means disposed in line between the pressurized sources for each component and the component entry ports of the unitary socket means. The converter means is generally effective to provide an exiting output flow of components having a constant regulated output flow rate at a relatively constant pressure.

In accordance with the preferred embodiment, the converter means comprises a fluid flow controller which generally includes an input channel leading to a dynamic, pressure responsive, spring loaded piston area. In the piston area, the incoming flow is subdivided into plural streams by redirecting the flow of material radially outwardly at 90° through side orifices. The material is redirected through another 90° bend and passes through the side orifices into a plurality of channel segments extending along a length of the controller housing. Thereafter, the flowing component passes through a consolidator which reforms the separate streams into a single exiting stream of components at a metered flow rate at relatively lower pressure. The spring loaded piston includes a collar portion with a corresponding aligned plurality of flow holes which move with the piston into and out of registration with the side orifices.

In accordance with the flow controller function, incoming pressure surges in a component stream cause the piston to move against the spring thereby moving the collar portion out of alignment with the side orifices, effectively narrowing the size of the side orifice. As the flow rate and pressure of the incoming stream return to a lower level, the spring acts on the piston moving it against the flow thereby opening the size of the side orifices defined by the cooperation of the collar openings and the side orifices. In this manner, the action of the piston movement is used to stabilize the flow during pressure fluctuations of the inbound component streams. In accordance with this preferred embodiment, for a flow controller to be consistently effective, there should be a significant pressure drop from the entrance side to the exit side of the fluid flow controlling devices employed as the converter means. In accordance with another aspect of the invention, care must be taken that each of the controlled, metered component flows exiting the flow controllers have sufficient pressure to ensure thorough, consistent and effective impingement mixing as the streams are introduced into the impingement mixing chamber or core aperture. In accordance with this feature, the present invention provides smoothly tapering graduated component flow passageways in the unitary socket member and carefully sized, tooled orifice insert elements to provide the desired re-pressurization of the streams, in a manner to be more fully described hereinafter.

In accordance with an especially preferred embodiment, the new and improved dispenser gun additionally includes a new and improved extended use life dispenser module. In this aspect of the invention, the new and improved dispenser module comprises a substantially rigid elongate housing and a valving assembly mounted therein. The rigid elongate dispenser module housing includes a peripheral sidewall, a front discharge end with a front discharge opening, an opposed rear end with a rear opening, an elongate central bore defined in said housing extending between the front discharge end and the rear opening and a pair of spaced apart module side entry ports extending through said peripheral sidewall at a point intermediate the discharge end and the rear end of the housing in fluid communication with said central bore.

The new and improved extended service life module also comprises a novel valving assembly which includes a front and a rear thermoplastic insert member, a front and a rear scraper ring, an end cap and a polished hardened steel valving rod. The valving assembly is generally telescopically received through the rear opening into the central bore of the housing and secured therein under a static axial compressive load by means of the end cap which is threadedly engaged within the rear end opening of the housing.

The front thermoplastic insert member preferably has a front end surface with a generally centrally located foam dispense opening which is gradually tapered to a pointed configuration. The front insert member further includes a rear end with a rear opening and has a central channel defined therein extending from the foam dispense opening to the rear opening. Preferably, the foam dispense opening of the front insert has the same configuration and dimensions as the foam discharge opening in the housing. The front insert member is preferably also provided with a stepped outer configuration so that it has a stepped shoulder defined thereon at a point along its length. The shoulder defines a forward minor cross-sectional configuration portion extending between the front end and the shoulder and a rearward major cross-sectional configuration portion extending from the shoulder to the rear end. The outer diameter of the major cross-sectional dimensional portion is selected to provide a tight, press fit engagement with the inner diameter of the central bore of the housing.

The front scraper ring is a flat generally circular metal stamping having a washer-like configuration including opposing front and rear major surfaces and a peripheral edge extending therebetween. A central rod scraping aperture is provided at the center of the scraper ring. The rear facing side of the rod scraping aperture is outwardly flared providing a tapered lead in. The diameter of the front scraper ring is slightly less than the diameter of the central bore of the housing to permit the scraper ring to freely float within the housing. The diametrical dimension of the front scraper ring and the rear facing tapered lead-in to the scraper aperture provide a self-centering aligning feature to the scraper ring to ensure insertion of the valving rod through the front scraper ring aperture. The diameter of the rod scraping aperture is designed to provide a scraping interference fit with respect to the outer diameter and surface of the valving rod.

The rear thermoplastic insert member has a front end surface with a front opening, a rear end surface with a rear opening and a channel extending therein between the front and rear openings. The rear insert member has an outer diameter selected to provide a fluid-tight press-fit engagement with respect to the inner diameter of the core bore of the housing. The rear insert member also includes a pair of side openings defined therein in communication with the central channel which are positioned for use so that they are disposed in sealed, fluid tight, registering engagement with the module side entry ports of the housing.

In an especially preferred embodiment, the valving assembly members with the exception of the valving rod, are fully installed in the module housing. Thereafter, the module side entry ports and the side openings are machined into the dispenser module leaving a tapped internally threaded port extending through the housing sidewall and, in a profiled manner through the rear insert member which are adapted to receive externally threaded, metallic orifice insert members. The internal diameters of the metallic orifice members are carefully selected to match the through put of the flow controllers to provide consistent impingement mixing and carefully controlled composition and properties for the dispensed curable foam products.

The rear scraper ring, in accordance with the preferred embodiment, has a generally circular washer-shape configuration including opposed front and rear major surfaces with an edge portion extending therebetween. A central rod scraping aperture extends therein which is provided with a diameter intended to provide a scraping interference fit with the inserted valving rod. An inwardly directed peripheral shoulder is provided adjacent the edge portion of the front major surface, which effectively defines a small, cylindrical, forwardly-projecting portion in the front surface of said rear scraper ring. The rear end opening of the central bore of the module housing is machined to provide a tapped enlarged area having internal threads extending forwardly over part of the axial length of the enlarged area. The rear scraper ring is inserted into the enlarged area of the rear end opening so that its forwardly projecting portion is received within the central bore and the remaining flat peripherally outer front surface portion is disposed in abutting face to face contact with the forward surface defined by the enlarged area.

The valving assembly further includes a back up end cap threadedly received in the enlarged portion of the rear end opening. The back up end cap preferably has a hollow cylindrical portion therein which is adapted to receive soft, lubricant/solvent-bathed packing washers for wiping the surface of the valving rod with lubricant/solvent twice during each activation cycle. Preferably, additional lubricant/solvent may be added to the rear end cap through lubricant/solvent entry ports extending rearwardly outside of the module housing. The forward edge portion of the hollow front end of the rear end cap, when the threaded end cap is tightened into the complementary threaded rear opening of the housing, is intended to urge the rear surface of the rear scraper ring forward to a dead stop against the inner end surface of the rear end of the housing. In fully seated position, the rear end cap applies a static compression axial load against the rear scraper which is transmitted to each of the valving assembly components positioned forward of the rear scraper ring in the core bore of the machine housing.

In accordance with this invention, the valving assembly includes a polished valving rod made from a hardened steel alloy, preferably hardened tool steel. The hardened steel rod may be repeated scraped by the interference fit apertures of the front and rear scraper rings, without becoming scratched or abraded. It has been discovered that for each activation cycle of the gun, i.e., rearward withdrawal of the valving rod within the valving assembly until the side entry ports and openings are unobstructed, followed by a forward stroke with the tip of the valving rod being received at the foam dispense and front discharge openings, a microscopic film layer of chemical components coats the valving rod. After repeated cycling, a buildup of curing foam material accumulates on the rod changing its surface dimensions and also its surface characteristics from smooth to uneven and abrasive. The abrasive build-up tends to tear up the surfaces of the polymeric insert members which leads to seal breakdown and gun and module failure after an undesirably low number of activation cycles. The new and improving valving assembly for use herein includes front and rear scraper rings positioned to remove the microscopic film layers to prevent the harmful effects of film build up on the rod. In accordance with this invention, as the valving rod withdraws rearwardly through the valving assembly upon activation, residue materials on the rod are scraped forwardly into the lumen of the central core aperture of the valving assembly. The rear end portion of the rod is wiped with fresh lubricant/solvent as it is withdrawn through the rear end cap. The chemical components flow into the impingement mixing chamber provided by the central aperture of the valving assembly and flow forwardly under pressure out through the foam dispense opening carrying previously scraped residue materials out with the dispensing foam. On the return forward stroke of the valving rod, the surfaces of the valving rod are scraped twice, first by the rear scraper ring and then by the front scraper ring. Any residual materials left on the rod on the withdrawal stroke are scraped off the rod by the rear scraper ring on the return forward stroke and accumulate in the lubricant/solvent packing washer chamber defined in the rear end cap. Rear scraper ring removed materials are accumulated in the lubricant/solvent washer chamber of the rear end cap which may be easily removed. The washers and accumulated debris may be taken out of the removable end cap and new washers may be installed to permit further continued use of the module.

In accordance with the new and improved dispenser module incorporating the hardened valving rod and valving assembly, a new and improved dispenser module or cartridge is provided capable of withstanding repeated activation cycling of at least about 20,000 activations as compared with prior art cartridges having service lives of only about 3,000 activation cycles before cartridge or module failure occurred.

In accordance with the preferred embodiment of the present invention, the stepped forward insert and rearward insert have a cylindrical configuration and provide the necessary sealed press fit engagement for the rearward major diameter portion of the front insert and the outer diameter on the rear insert within the housing adjacent the chemical side entry ports. The forward, minor diameter portion of the front insert has a diametrical dimension slightly less than that of the housing passageway to provide a clearance between the forward ends of insert and passageway. The provided clearance, in accordance with a preferred embodiment, permits relaxation of the valving assembly and insert members in a controlled manner while maintaining necessary seal retention or engagement between the inserts and housing adjacent the side entry ports. The controlled relaxation of the inserts reducesor eliminates the build up of residual stresses in the inserts believed to be responsible for cold flow deformation of the inserts. The new and improved dispenser front insert and module design provides that cold flow of the inserts, should it occur, will generally occur in a controlled manner in predetermined locations on the front insert and is designed to maintain and promote critical component entry seals between the rear insert and housing. Controlling cold flow distortion of the insert members by use of the scraper rings and the stepped front insert configuration leads to substantially reduced leakage and improved module use life.

In accordance with the preferred embodiments, the insert members are preferably formed from a thermoplastic material such as TEFLON ® or other fluorocarbon material which exhibits a non-adherent surface characteristic to the foam composition and its components. The gun of this invention also includes: means for mounting the module relative to the socket and means for moving the valving rod between the open and closed positions.

In accordance with a preferred embodiment, the means for moving the valving rod between the open and closed positions comprises a double acting air cylinder actuator. Also in the preferred embodiment, the dispenser module is provided with a forwardly extending cylindrical projection at the front end of the housing adapted to slidably, telescopically receive a foam dispenser guide member in the form of a hose or tube extender. Foam discharged through the projecting front foam discharge opening travels along the guide member to a desired target location. In order to force a slug of foam to travel completely out of the guide tube or hose, in accordance with an alternate aspect of this invention, at least one air purge aperture is defined in the front discharge face on the projecting cylindrical portion of the housing. The air purge aperture(s) are connected by small air ducts to a selectively controllable source of forced air. Mounting means for mounting the guide hose or tube member in air tight relation onto the forwardly projecting cylindrical nose portion of the housing are also provided. The air purge system introduces a shot of forced air into the guide tube member behind an amount of previously dispensed foam to hydrostatically cause expulsion of the foam from the guide tube.

Other objects and advantages of the present invention will become apparent from the following detailed description taken in conjunction with the drawings in which:

BRIEF DESCRIPTION OF THE DRAWINGS

FIG. 1 is a side elevation view of the preferred embodiment of the new and improved thermal insulation grade foam dispensing gun of the present invention including the unitary socket member and in-line flow controller converters;

DETAILED DESCRIPTION OF THE PREFERRED EMBODIMENTS

Figures 3, 14:
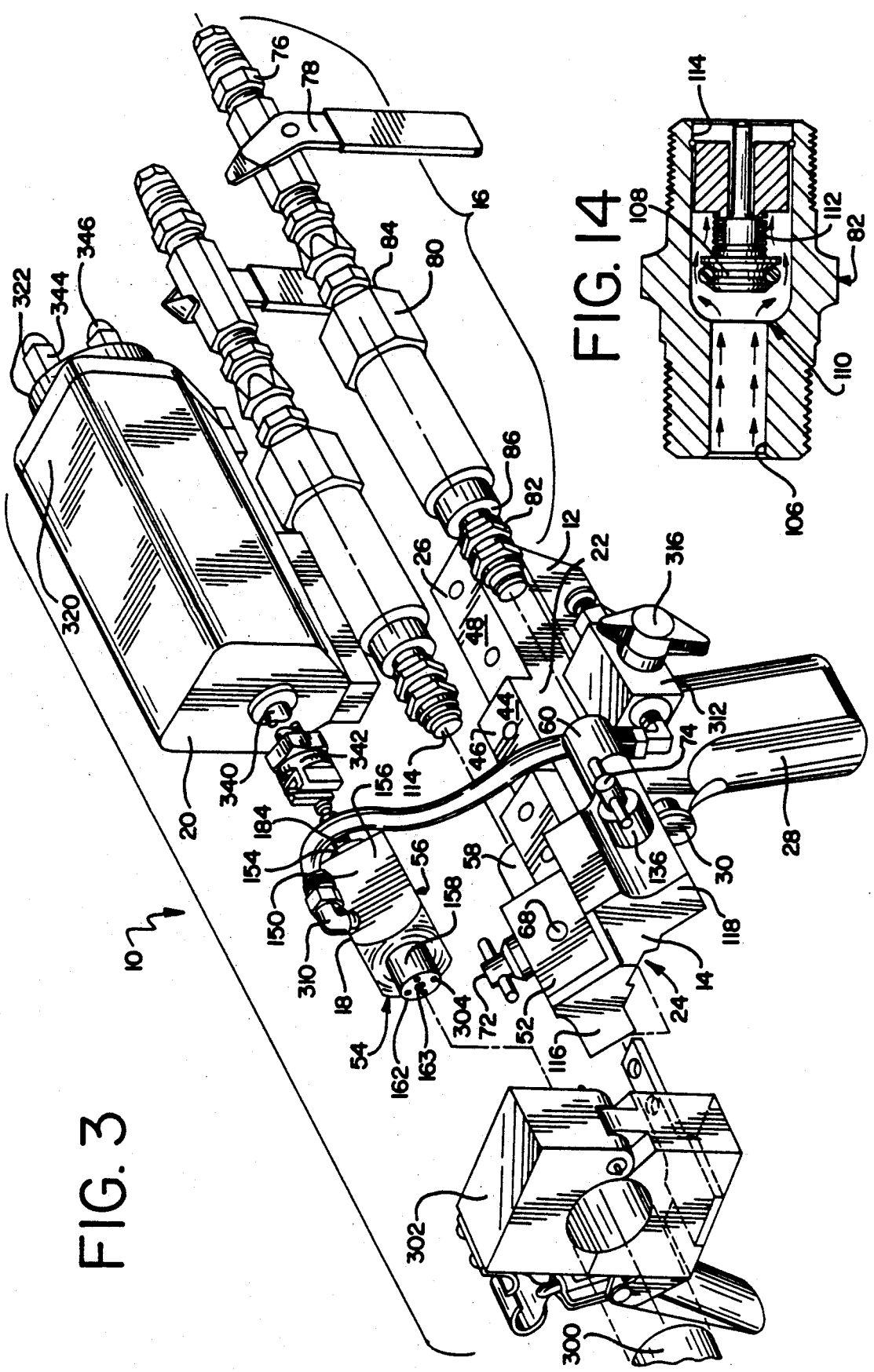
FIG. 3 is an exploded perspective view of the new and improved dispensing gun in accordance with the preferred embodiment of the invention as shown in FIGS. 1-2.
FIG. 14 is an elevated cross-sectional view of a check valve for use in the component entry circuit in accordance with the preferred embodiment of the present invention to prevent cross over contamination of one inbound component into the incoming supply line of the other component.
Figure 2:
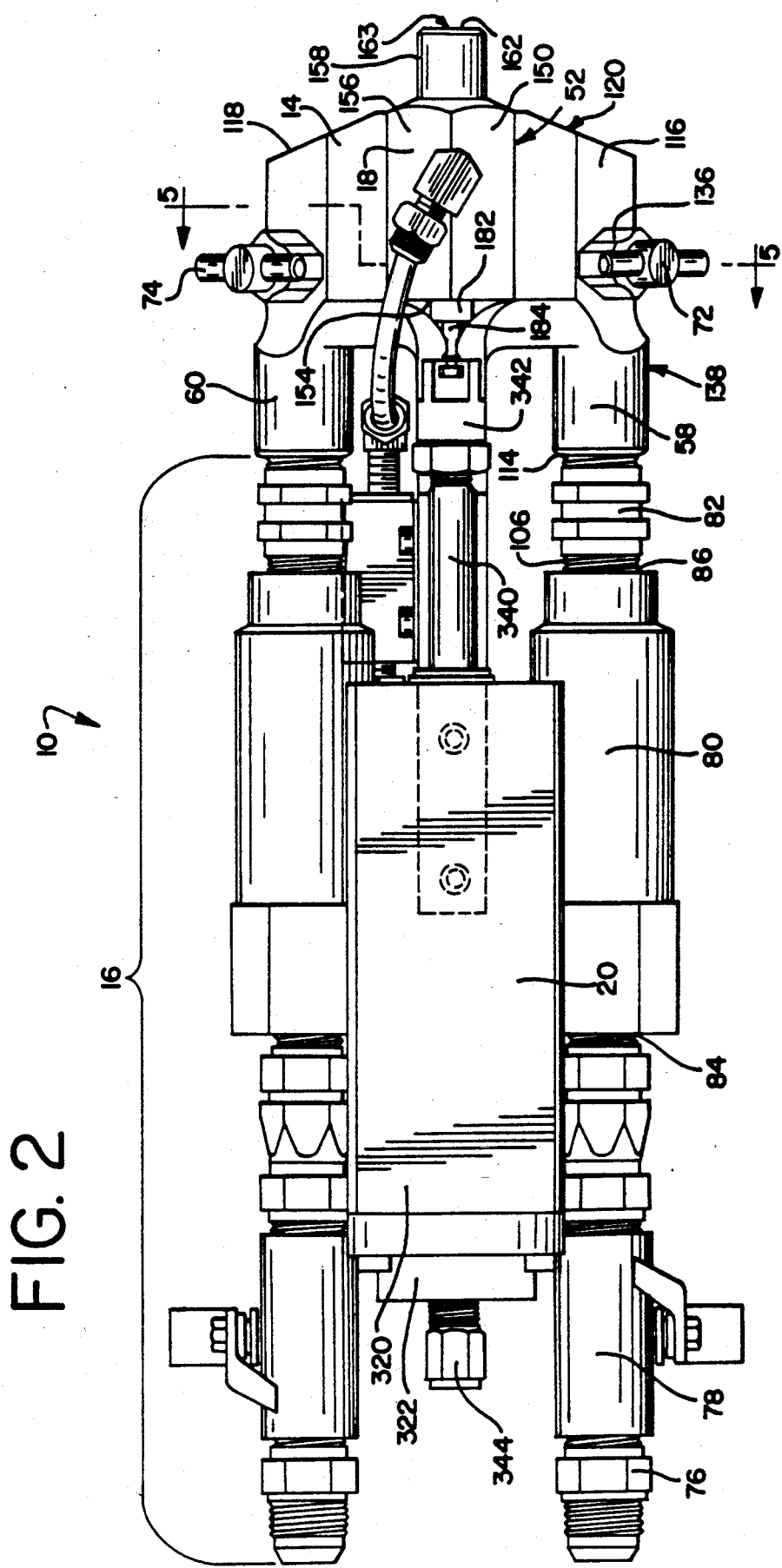
FIG. 2 is a top plan view of the new and improved dispensing gun of the preferred embodiment as shown in FIG. 1.

Referring now to FIGS. 1-3, a new and improved thermal insulation grade, solventless, flushless hand held dispensing gun for dispensing reactive chemical foams, generally referred to by reference numeral 10, is shown. In the preferred embodiment depicted in the Drawings, dispenser gun 10 is especially adapted for dispensing controlled quantities of controlled quality thermal insulation grade foams for use in thermal insulation applications. As shown in FIGS. 1-3, new and improved dispenser gun 10 is provided with an advantageous combination of parts or elements rendering gun 10 especially suited to thermal insulation applications including: a gun body 12, a unitary socket member 14, a converter subassembly 16, an extended use life dispenser module 18 and a double-acting, multi-piston air cylinder actuator assembly 20.

In the preferred embodiment, dispensing gun 10 includes a number of advantageous elements which now permit solventless impingement mixing methods to be employed in a dispensing system for thermal insulation grade foam installation applications. In accordance with the preferred embodiment, this advantageous result is obtained by dividing a substantially leak-free unitary socket member adapted to receive a dispenser module including an impingement mixing chamber defined within a core aperture of this dispenser module. Special fixed flow pressure compensated fluid flow controllers are provided to introduce controlled metered amounts of components into the socket member for transmitting known quantities of chemical components into the impingement mixing chamber.

In accordance with especially preferred aspects of the invention the new and improved dispensing gun shown in FIGS. 1-3 not only includes the fluid flow control system and the unitary socket assembly but also includes a new and improved dispenser module design including an air purge circuit for use with foam directing extender hoses placed on the front end of the module and includes a new and improved double-acting double power air cylinder for opening and closing the valving assembly included within the dispenser module. In accordance with the preferred embodiment, the new and improved unitary socket member is best shown in FIGS. 3-6, the new and improved converter subassembly including the fluid flow controller systems is best shown in FIGS. 1-3 and 13 and 14. The new and improved extended use life cartridge for use in connection with the preferred embodiment is best shown in FIGS. 1-5 and 7-10 and in accordance with an especially preferred embodiment the gun will include the double-acting double power air cylinder actuator system shown in FIGS. 1-3 and FIG. 12.

Gun body 12 includes an upper body mounting portion 22 having a front end 24 and an opposed rear end 26. A piston grip handle portion 28 extends downwardly from the upper body portion 22 to provide convenient means for holding gun 10 in one hand. A depressible electronic trigger button 30 is shown projecting forwardly from an upper forward facing portion on handle 28. Trigger button 30 is electrically connected by means of cable 32 to an electronic controller 34 having a timer and an air solenoid valve for directing pressurized air through tubing 36 or 38 connected to air cylinder assembly 20. The controller is connected to an electric power supply by means of a plug connector 40.

The upper surface 42 of upper body portion 22 includes a forward end portion adjacent front end 24 adapted to receive the mountable unitary socket member 14 by means of threaded mounting screws 44 received in threaded screw-receiving mounting apertures 46 defined in upper surface 42. Upper surface 42 also includes a downwardly stepped rearward mounting portion 48 adapted to mountedly receive air cylinder actuator assembly 20. Upwardly directed threaded mounting screws 50 secure the air cylinder actuator assembly 20 to gun body 12.

In greater detail, and referring now to FIGS. 1-3 and 4-6, the new and improved dispenser gun 10 of the present invention includes a one-piece, substantially leak-free unitary socket member 14 mounted onto the front end 24 of mounting section 22 of gun body 12. Unitary socket member 14 includes a module receptacle portion 52 having a generally V-shaped configuration, adapted to sealably receive complementary confronting surfaces 54,56 of a generally rectangular dispenser module 18. The unitary socket member 14 also includes a pair of laterally spaced rearwardly facing component entry ports 58,60 disposed on opposite sides of the upper mounting portion 22 of the gun body 12. The component entry ports 58,60 are provided to introduce the separate chemical components of a two-part reactive chemical composition, such as a polyol component and an isocyante component, into the socket member 14 preparatory to being admitted into an impingement mixing chamber defined in a core aperture 62 within dispenser module 18. Unitary socket member 14 includes specially configured and dimensioned internal chemical component passageways 64 and 66 on each side of the socket member respectively, and leading to the receptacle portion 52. More particularly, the chemical component passageways 64 and 66 each exit at a component exit port 68 and 70 defined on respective side surfaces in the receptacle portion 52. As shown in FIGS. 1-3, rotatable on/off valves 72 and 74 extend into the chemical component passageways 64 and 66 on each side of the socket member 14 to permit the inbound component source lines to be shut down at the gun without the need for disconnecting the supply lines from the pressurized sources of the components rearward of component entry ports 58 and 60 of the socket 14. Providing on/off valves 72 and 74 within the gun head facilitates dispenser module changeover for correction or servicing and permits the sensitive seal regions in the dispenser module portion of the gun to be unloaded when not needed for immediate use.

In accordance with the preferred embodiment depicted in FIGS. 1-3, each of the sources of the components A and B entering the gun dispensing system 10 are provided with a converter subassembly 16 capable of receiving high pressure components of variable flow rate and converting these flows to relatively lower pressure, regulated consistent streams of known quantity, flow rate and pressure for entry into the socket member 14 of the gun 10. The converter subassembly 16 includes from back to front a rear swivel fitting 76 for making threaded hose connections to sources of supply of the components A and B under pressure, a ball valve 78 for turning on and off the hoses from the supply lines, a fluid flow controller 80 for changing the variable flow stream into a fixed flow stream, a unidirectional check valve 82 to prevent cross-over contamination of the component entry line A and B which is ultimately received in a threaded component entry ports 58,60 machined and defined in the rear end portions of the unitary socket member 14.

Most of the elements for forming the in-line converter subassembly 16 are commercially available and may have been used in prior art static mixing solvent dispensing systems to provide controlled amounts of components to a static mixing/solvent flush dispensing system. However, heretofore it is not known to use these flow controller means 80 for feeding controlled flows of components to a solventless impingement mixing dispenser module such as module 18 in the thermal insulation context. The swivel fitting 76 is a known piece of hardware well known to those skilled in the art.

Figure 13:
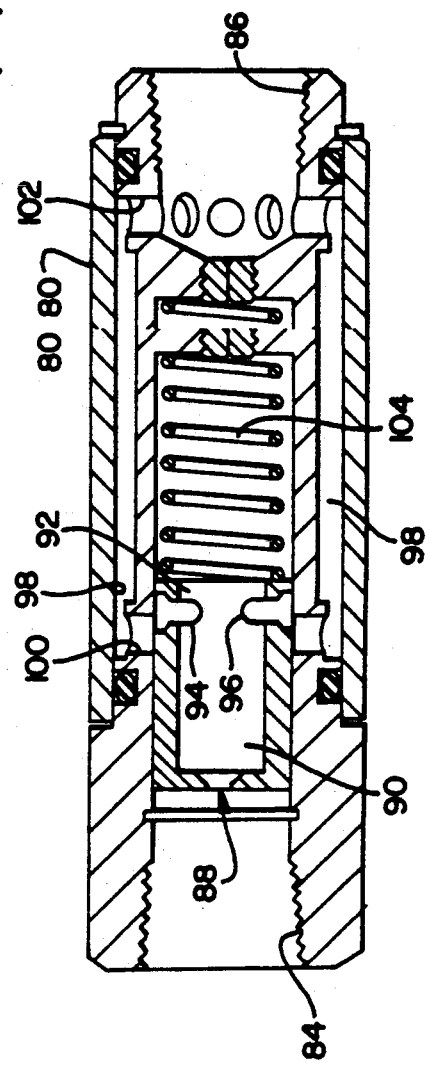
FIG. 13 is an elevated cross-sectional view of the preferred flow controller converter for use in accordance with the present invention.

The hand operated ball valve 78 is also well known in pressurized fluid connections of the type shown. The fluid flow controller 80 is of a commercially available type best shown in FIG. 13. As shown in FIG. 13, the fluid flow controller member 80 includes a forward threaded entrance opening 84 and a rearward threaded metered flow exit opening 86. Incoming components at high pressure and variable flow rate are directed to a narrow aperture 88 in a floating piston chamber 90. The floating piston chamber 90 has the forward aperture or opening 88 at one end and a piston wall 92 at the opposed end. A pair of side apertures 94,96 are defined therein which permit entering component to flow out of the piston chamber 90 into a radially outwardly defined component flow channel 98 including a channel entrance opening 100 at the left end and a channel exit consolidating opening 102 at the right exit end as shown in FIG. 13. The side component flow apertures 94 and 96 defined in the floating piston chamber member 90 are spring loaded in a forward position by means of a spring 104 to be disposed in registering relationship with the channel entrances 100 at the left end of the controller member 80 as shown in FIG. 13.

In accordance with the flow controller design as shown in FIG. 13, incoming variable flow and variable pressure components first enter through the entrance apertures 84 to fill the piston chamber 90. The variable regulating opening formed by the registering relationship between the side openings 94 and 96 in the piston chamber 90 and the channel entrance openings 100 may be varied against the action of the spring 104 depending on the incoming pressure of the inbound components. In this way the flow is pressure regulated and metered by floating the piston 90 relative to the outer flow channel 98 in use to provide a dynamically regulated flow. The pressure drop from the entrance side 84 of the flow controller 80 to the exit side 86 needs to be sufficient to permit the spring action on the piston 90 to operate properly to regulate the flow and even out any flow irregularities caused by differential pressures of the incoming component feeds. The fluid dynamics of the flow controller 80 provide a substantially uniform pressure, metered flow rate component stream exiting the flow controller 80 which has a known quantity of component being delivered at a known pressure and flow rate which is however generally too low a pressure to provide substantially thorough and complete impingement mixing in typical impingement mixing dispenser modules. In accordance with the important feature of the present invention the low pressure metered exiting stream is re-pressurized to provide good impingement mixing pressure in a carefully controlled manner within the unitary socket member 14 in a manner to be more completely described hereinafter.

Referring now to FIG. 14 the converter subassembly 16 further includes a one-way check valve assembly 82. As shown in FIG. 14 check valve 82 is of a known commercial variety which prevents any reverse direction or backflow of component in the component delivery lines A or B along the flow controllers 80, ball valves 78, swivel fittings 76 or into the component supply hoses A and B. In accordance with the view shown in FIG. 14, the controlled pressure metered component flow exiting the flow controller module enters the check valve 82 through the entry port 106 shown on the lefthand portion of the valve 82 as depicted in FIG. 14. The incoming pressure of the metered flow controlled component stream pushes a valve piston 108 off of the valve seat 110 against the action of a coil spring 102 to permit the controlled meter flow to flow through the valve body 82 and exit through the check valve exit opening 114 into the component entry ports 58 and 60 in unitary socket member 14 in which the righthand portions of the check valves 82 are threadedly and sealingly received as shown in FIGS. 1-2. Any decrease in the incoming pressure or flow rate of the materials coming through the flow controller modules 80 will cause the check valves 82 to shut by action of the coil springs 112 to prevent any countercurrent flow and contamination from being transmitted along the inbound component entry line to insure that, in the unlikely event of any gun or module failure, contamination of the incoming supply lines will not occur, but instead, any contamination problem will be localized to the socket member 14 and dispenser module 18 only, which elements may be replaced if necessary in accordance with the design.

Figure 4:
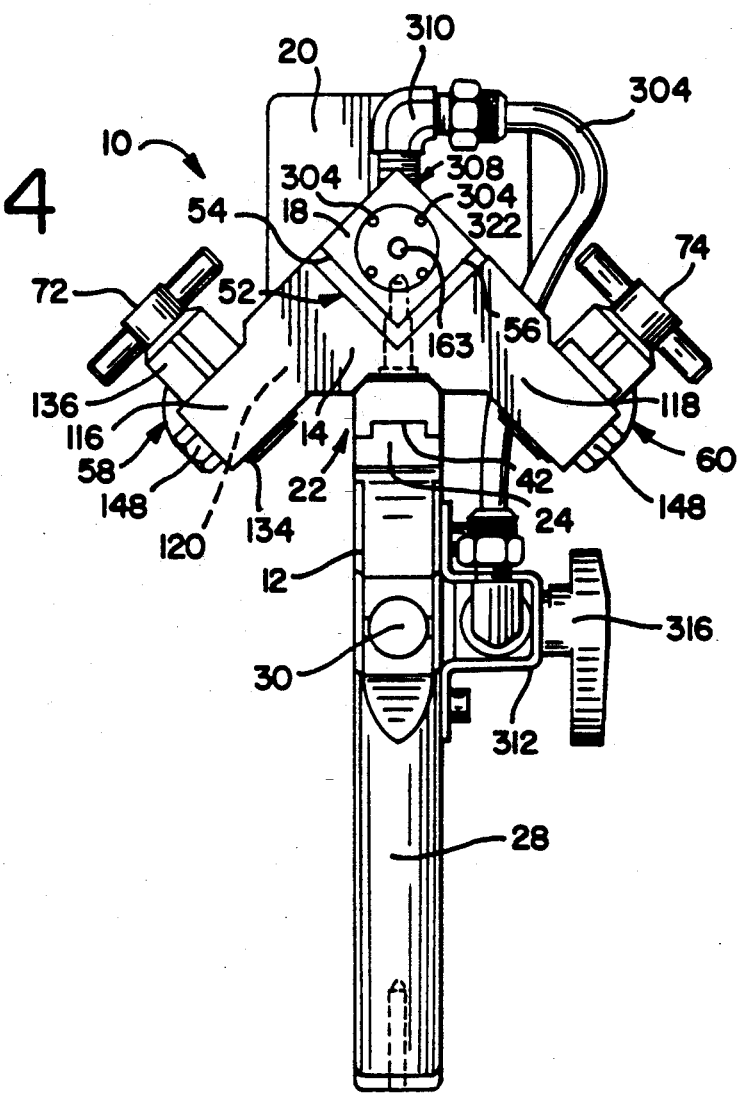
FIG. 4 is a front end elevation view of the new and improved dispensing gun of the preferred embodiment.
Figure 5:
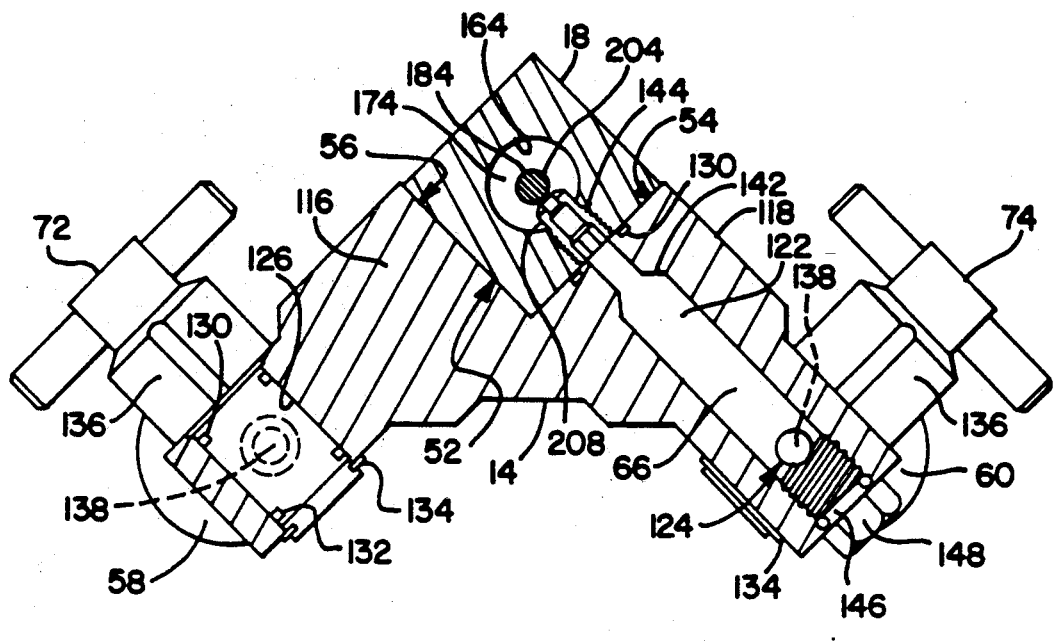
FIG. 5 is an elevated cross-sectional view of the new and improved unitary socket member, component orifice insert and dispenser module, in accordance with the preferred embodiment, taken along view lines 5—5 in FIG. 2.
Figure 6:
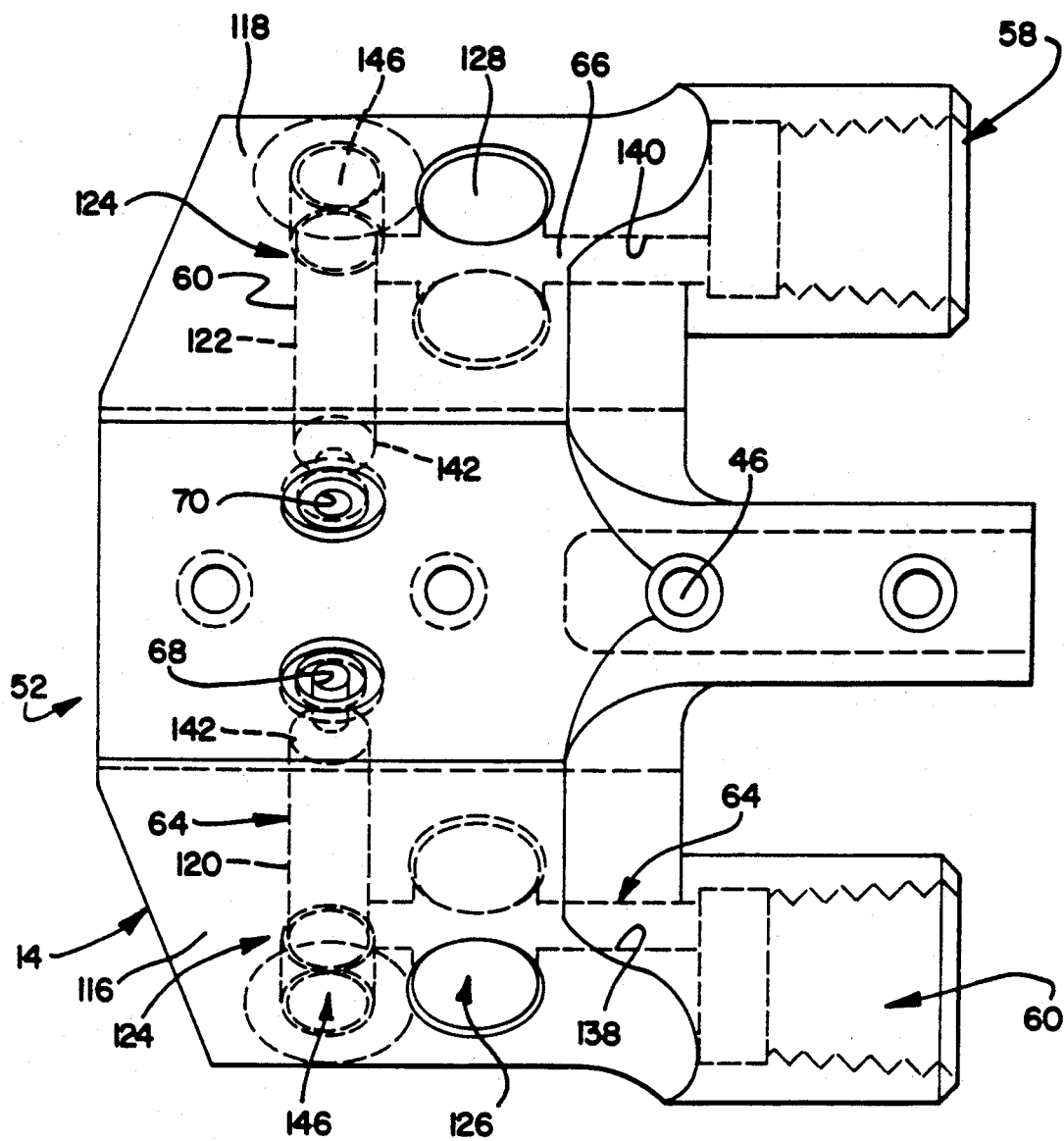
FIG. 6 is a top plan view of the new and improved unitary socket member in accordance with the preferred embodiment with portions of the component entry ports and chemical component passageways defined within the socket member shown in phantom.
Figure 9:
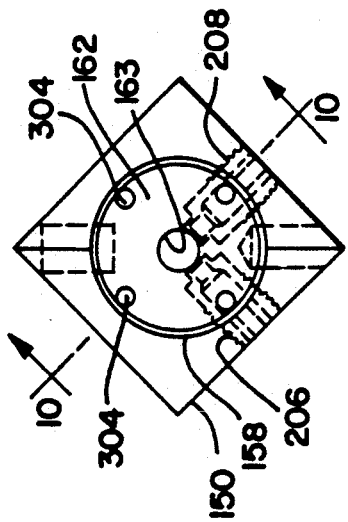
FIG. 9 is a front end elevation view of the new and improved dispenser module taken along view lines 9—9 in FIG. 7 and showing the side entry ports and side openings in the assembled module in phantom.
Figure 7:
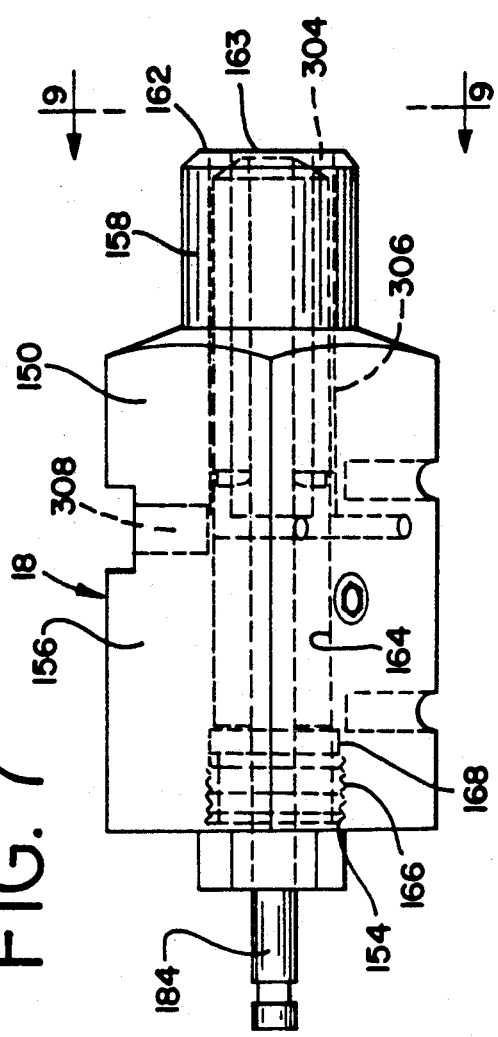
FIG. 7 is a side elevation view of the new and improved extended use life dispenser module of the preferred embodiment with the air purge circuit elements shown in phantom.

Referring now to FIGS. 1-3 and more particularly FIGS. 4-6, the new and improved unitary socket member 14 for use in the dispensing gun 10 of the present invention is shown. The socket member 14 includes a one-piece metallic body provided with a V-groove receptacle portion 52 for receiving the dispenser module 18 in press-fit wedging sealed engagement therewith. The component entry ports 58 and 60 are spaced from the receptacle portion 52 so that they extend parallel to the gun body 12 disposed on lateral sides of the upper portion 22. Socket member 14 has outwardly angled and rearwardly extending side arm portions 116, 118 which include generally L-shaped chemical component passageways 64 and 66 extending through the socket member 14 between threaded rearward component entry ports 58 and 60 to a pair O-ring sealed component exit ports 68 and 70 defined in aligned and opposed surfaces within the V-groove of the receptacle portion 52 of the socket member 14. The L-shaped chemical component passageways 64 and 66 are disposed at a 45° angle with respect to the midline of the gun body 12 and include a 90° right angle bend (at 124) to permit the converter subassemblies 16 and their attachment into the component entry ports 58 and 60 to be disposed in parallel on opposed sides of the gun body 12. The parallel entry ports 58 and 60 straddling the gun body 12 provide a more balanced gun and permit the hoses to be out of the way in use. The length of the outwardly flared up legs 120 and 122 between the receptacle portion 52 and the right angle bend at 124 has been selected to space the converter subassemblies 16 and component entry portion 58 and 60 of the gun laterally outwardly from the gun handle 12 by a clearance sufficient to permit easy access for tools to facilitate threaded engagement of each of the various component entry and converter assembly elements.

Referring now to FIG. 5, each chemical component passageway 64 and 66 is provided with an on/off turning valve member 72 and 74 which is slidably received in sealed press-fit relation in a valve passageway 126,128 which intersects the respective chemical component passageway 64 and 66. The hand valves 72 and 74 include a pair of O-ring seals 130,132 as shown and a split ring 134 and nut 136 arrangement to secure the manipulable valve members 72 and 74 onto the unitary socket member 14.

Referring to FIGS. 5 and 6, the chemical component passageways 64 and 66 defined within the unitary socket member 14 include a relatively longer parallel shaft element 138,140 extending generally parallel to the gun body 12 and an angled upward shaft segment 120,122 disposed at right angles to the parallel shaft 138,140. In accordance with an important feature of the present invention, the angled up leg segments 120,122 include a number of tapered gradual stepped reductions in internal diameter such as shown at 142, to build up the pressure of the metered controlled flow components flowing therein immediately before they enter the core aperture impingement mixing chamber 62 in dispenser module 18 to provide the necessary impingement mixing pressure to insure uniform and thorough mixing of the compounds within the dispenser module 18. The gradual step down of internal diameter of these chemical component passageways 64 and 66 continues in the tooled orifice inserts 144 shown in FIGS. 4, 8 and 10-11. The gradual tapering and stepped configuration of the angled up leg 120,122 of the chemical component passageways 64 and 66 provides a pressure balance for a given aperture or orifice internal diameter size, capable of providing the requisite amount of impingement mixing pressure side openings to the impingement mixing chamber, without causing an undesired back pressure to build up which would curtail operation of the fluid flow controller components 80 by disadvantageously reducing the pressure drop across the fluid flow controller members 80. The pressure balancing achieved in accordance with the present invention is rather specific for each increment of controlled metered flow and throughput desired for the particular foam dispensing application. For each fixed flow pressure compensated flow controlled incoming stream of a given pounds per minute flow rate an orifice internal diameter dimension must be determined which provides adequate impingement mixing pressure at the impingement chamber without adversely affecting the controlled flow characteristics of the inbound stream. The pressure balancing aspect of the gun in accordance with this invention is provided by the gradual tapering steps 142 in the chemical component passageways 64 and 66 and continuing the gradual tapering in orifice inserts 144 to the point of immediate entry into the impingement mixing chamber. As shown in FIG. 5 the up leg 120,122 of the chemical component passageway 64 and 66 is preferably provided with a threaded cleanout opening 146 which is adapted to receive a sealed threaded cleanout nut 148 to provide ready access to the chemical component passageways 64 and 66 in the event any undesired contamination or blockage is encountered within the unitary socket member 14.

In accordance with a major aspect of the present invention, the combination of the unitary socket member 14 and the flow controller component subassemblies 16 provides a distinct and special advantage in the field of dispensing urethane foams for thermal insulation purposes. In thermal insulation context, the foams dispensed in prefabricated containers must reflect certain desired thermal insulation values and other physical properties. In order to accomplish this, the mixing must occur at a proper flow ratio between the polyol and the isocyanate components. Repeatability, reproducibility and consistency in metering, ratioing and mixing of the components within the dispensing equipment is required to meet design specifications and thermal insulation parameters. The combination of the new and improved gun 10 provides a balancing concept between the flow control valves 80 installed on the gun and the orifices defined within the dispenser module 18 where direct impingement mixing takes place. Because of fluid dynamics phenomena, the chemicals experience a pressure drop as they pass through the flow controller valves 80. The function of the unitary socket member 14 and orifices in the dispenser module 18 is designed to provide a balancing build up of pressure in the incoming flow streams to have thorough mixing of the components within the dispenser module 18. The size of the impingement mixing chamber and the size of each of the orifices 144 must be determined for each desired throughput so that the pressure build up provided within the socket 14 and dispenser modules 18 does not overcome the pressure drop required by the flow controller subassemblies 166. The combination of the in-line flow controllers and the tapering orifice sizes represent a unique balancing concept under which this gun operates which now permits the solventless impingement mixing chambers to be used in the thermal insulation context.

In addition to the controlled pressure and flow rate benefits provided by the dispenser gun 10 of the present invention, the present invention also provides in accordance with an alternate aspect of the invention shown in the drawings a new and improved dispenser module 18 for dispensing reactive chemical foams. The dispenser module which is especially advantageously used with the thermal insulation grad dispensing equipment heretofore discussed may also be used in other less stringent contexts with other gun handle and component entry equipment.

The structure and operation of the new and improved extended use life dispenser module 18 in accordance with this aspect of the present invention is best shown in FIGS. 5 and 7-10.

As depicted therein, the new and improved extended use life dispenser module 18 comprises a substantially rigid elongate housing 150 and a valving assembly 152 telescopically received therein through a rear opening 154 provided in the housing. The rigid housing 150 includes a peripheral side wall 156 which preferably has a multi-sided or rectangular configuration. In the preferred embodiments depicted in FIGS. 7-10, a forward cylindrical nose portion 158 for receiving a disposable guide tube 160 is provided to redirect dispensed foam exiting the front end 162 of the dispenser module 18 into tight or hard to reach locations. The rigid housing 150 includes a core bore 164 extending therethrough and defined between the enlarged threaded entrance rear opening 154 and a relatively narrower front discharge opening 166 in the front surface 162 of the cylindrical projecting nose portion 158. As shown, the rear opening 154 is tapped to provide an internal threaded portion 166 extending inwardly from the rear end which then stops to provide a tapped dead end space or area 168. The dispenser module housing 150 may be machined from rectangular bar stock using computer assisted machining tools to provide precision dimensions throughout the part.

In accordance with the new and improved dispenser module of the present invention, the dispenser module 18 includes a valving assembly 152 telescopically received through the rear end of the dispenser housing 150. The valving assembly best shown in FIG. 8 includes a stepped front insert member 170, a front scraper ring 172, a rear insert member 174, a rear scraper ring 176, a pair of lubricant/solvent wetted felt washers 178,180, an end cap 182 and a valving rod 184. More particularly, the front elongate thermoplastic insert member 170 has a front end surface 186 with the foam dispense opening 188 out of which the impingement mixed thermal insulation grade foam will be dispensed. A rear end surface 190 of the front end insert 170 is provided with a rear opening 192 and a central channel 194 is provided extending between the rear opening 192 and the front foam dispense opening 188. The channel 194 within the front insert member 170 comprises a portion of the central core aperture Within the valving assembly which defines the impingement mixing chamber therein. The front foam dispense opening 188 of the front insert member 170 has substantially the same configuration and dimensions as the foam discharge opening 163 provided in the front end 162 in valve housing 150. As depicted in the drawings, the valving assembly 152 further includes a rear elongate thermoplastic insert member 174 also having a front end surface 196 with an opening 198, a rear end surface 200 with an opening 202 and a central channel extending between the front and rear openings 198 and 202, which defines a rearward portion of a central core aperture through the valving assembly 152. The rear insert member 174 further includes a pair of side openings 206 and 208 for introducing components under impingement mixing pressure into the central core aperture 194 and 204 of the Valving assembly 152.

In accordance with the present invention the valving assembly 152 further includes a front scraper ring 172 provided with a central rod scraping opening 210 and a rear scraper ring 176 with a rod scraping opening 212. The front scraper ring 172 has a forward major surface and a rear major surface interconnected by an edge portion. The diameter of the front scraper ring is slightly less than the internal diameter of the core aperture 164 of the housing 150. The rear side surface circumferentially surrounding the central rod scraping aperture of the front scraper ring is provided with an inward tapering contour 214 to provide a self-centering lead-in for directing the tip of the valving rod 184 through the rod scraping aperture 210 of the front scraper ring 172 in use. The rear scraper ring 176 includes a stepped forward configuration to define an inwardly directed shoulder 218 which is press-fittingly received into the tooled rear end opening 166 of the valve housing 152 to define a fully seated condition for the rear scraper ring 176. The rear scraper ring 176 is held until axial compressed loading in position by a threaded engagement and advancing of the threaded end cap member 182 into the rear end 166 of the housing until the rear scraper ring bottoms out against the machined rear end structures of the housing.

Figure 10:
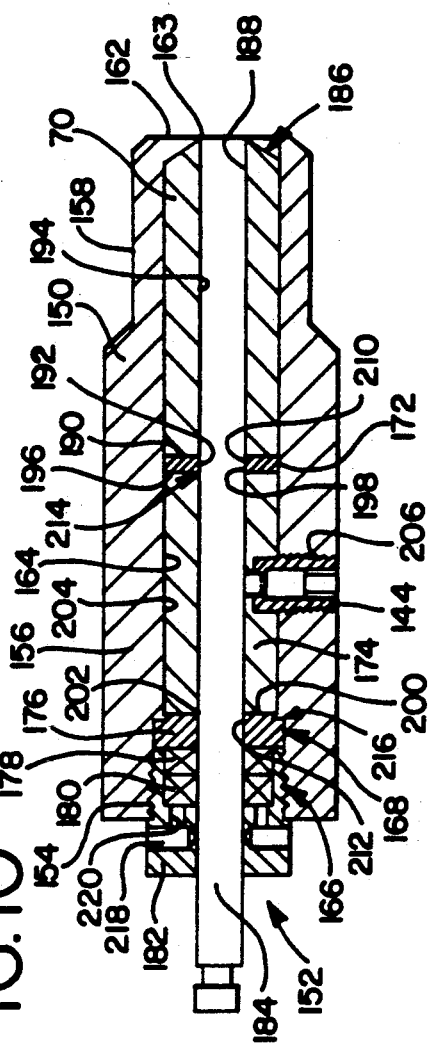
FIG. 10 is an elevated cross-sectional view of the new and improved fully assembled dispenser module in accordance with the preferred embodiment, taken along view lines 10—10 in FIG. 9.

As shown in the fully assembled condition in FIG. 10 the threaded end cap 182 applies a static axial load on the valving assembly 152 urging the rear scraper ring 176 forwardly to fully seated condition in the rear end of the housing 154. This urges the rear end, the rear insert member, front scraper ring and front insert member fully forwardly to a full seated position within the core aperture of the housing. As shown in FIG. 10 in fully seated condition, a portion of the end cap extends outwardly of the rear end of the housing which is provided with lubricant/solvent reservoirs 228 and an interconnecting channel 220 to permit additional lubricant or solvent to be added to the felt washers 178, 180 trapped within the rear end cap 182 structure as shown.

In accordance with the new and improved dispenser module of the present invention the valving rod 184 comprises hardened highly polished tooled steel having an outer diameter surface configuration which cannot be abraded, scraped or changed by the interference fit and scraping relationship with the front and rear scraper rings 172 and 176 in the assembly. The front and rear scraper rings in accordance with the design scrape microscopic film layers of foam from the surface of the valving rod 184 during each rearward and forward activation stroke of the valving rod 184. Prior to inserting the hardened steel valving rod through the rear end cap 182 and into the fully seated valving assembly 152, the component side entry ports 206 and 208 are machined through the side wall 156 of the housing 154 and into the rear insert member 174 to define side openings through the housing and rear insert opening into the core impingement mixing aperture 204 of the valving assembly 152. The machined side openings 206 and 208 are adapted to receive a threaded metallic orifice insert member 144 best shown in FIG. 11 having an externally threaded outer configuration portion and having a stepped internal diameter extending between an enlarged component entry side adapted to be disposed against the O-ring seals 222 of the receptacle portion 52 of the socket member 14 and a forward nose-tipped portion adapted to be received in the rear insert member 174 immediately adjacent the impingement mixing core aperture 204 provided therein. As has been mentioned above, the dimension of the impingement mixing core aperture 204 and 194 through the valving assembly and of the orifice insert 144 front end aperture diameter must be selected to provide adequate flow and pressurized impingement mixing of the components at the impingement mixing chamber entrances 206,208 without disadvantageously affecting the required pressure drop adjacent the fluid flow controller subassembly 76 for those applications where carefully controlled thermal insulation grade foams are being dispensed.

In the preferred embodiment shown in FIGS. 1-3 and 7-9 the new and improved dispenser module in accordance with the present invention is optionally but preferably provided with an air purge and guide tube delivery system for delivering controlled amounts of foam at a distance from the gun head.

Figure 11:
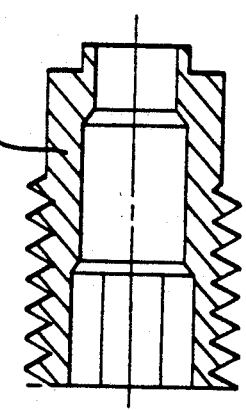
FIG. 11 is an elevated cross-sectional view of the new and improved component orifice insert member in accordance with the preferred embodiment.
Figure 11A:
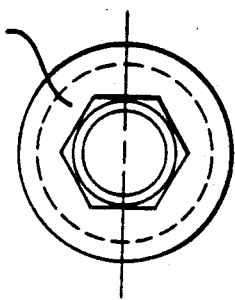
FIG. 11A is a side-end view of the component orifice insert member of FIG. 11.
Figure 8:
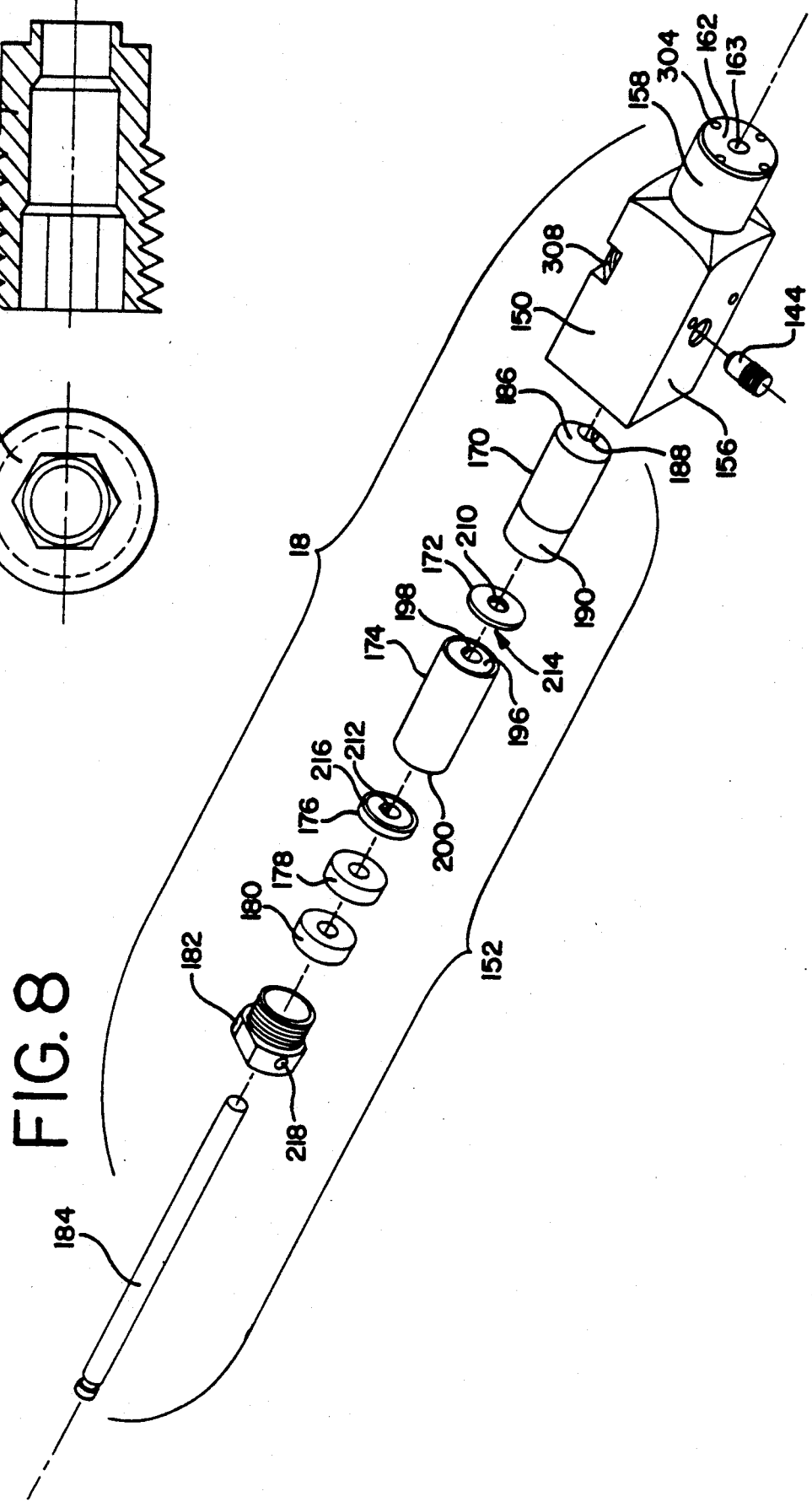
FIG. 8 is an exploded perspective view of the new and improved dispenser module of the preferred embodiment showing the component parts of the valving assembly in accordance with a preferred feature of the invention.

In accordance with a preferred embodiment, the dispensing gun will be used in an assembled form which includes a flexible or rigid, cardboard or plastic guide tube 300, indicated in FIGS. 1, 5 and 11. Guide tube 300 has an inner diameter selected to be closely slidably and telescopically received over the forwardly projecting nose portion 158 of the module housing 150. In addition to a press-fit engagement onto nose portion, a mounting means in the form of a manipulatable reclosable hose clamp 302 may be used to provide an air tight gripping engagement of the foam guide tube on the nose portion.

Manipulatable hose clamp 302 includes a pair of generally rectangular clamp halves each provided with aligned and opposing semi-circular cutouts to define circular clamping surfaces. The clamp halves are hingedly connected at one side thereof to permit them to be pivoted away from each other to permit installation and removal of a guide tube on the nose portion. A releasable manual actual cooperating latch is provided on the other sides of the clamp halves including a latch hook and a latch arm. Engaging the hook and latch arm and moving the latch lever arm to a closed position forces the confronting latch surfaces together forming an air tight seal between the foam guide and the nose portion of the housing.

In those embodiments or applications where the extender or foam guide is used it is preferable to provide a means for delivering a shot of forced air or other propellant gas to hydrostatically deliver a charge of previously dispensed foam travelling within the guide tube, completely out of the foam guide tube to prevent clogging. In accordance with this aspect of the invention air purge apertures 304 are defined in equispaced positions the front face 162 of the nose portion 158 of the housing 150 radially outwardly from the foam discharge opening 163. The air purge apertures 304 are connected by discrete air passages 306 to a common purge air entry port 308 equipped with an air tight hose coupling, such as an NPT elbow 310 as shown. An air hose extends from elbow 310 to a purge air valve 312 mounted on the side of the gun body. The purge air valve 312 includes a pressurized air hose coupler fitting 314 and a rotatable valve knob 316 to open and close a Valve to permit air to flow through this purge air circuit to exit within the foam guide tube through the purge air apertures 304. Providing a purge air circuit and means for purging the foam guide extenders permits the extenders to be reused and reduces their consumption. The clamp may be fixedly, rigidly mounted to a mounting plate 320 by mounting screws 322 which may, in turn, be mounted to the gun body by more mounting screws as shown in FIG. 3.

In accordance with the present invention and referring again to FIGS. 1–3 and 12, the new and improved dispensing gun 10 additionally includes a double-acting multi-power air cylinder actuator assembly 20 for controlling the movements of the valving rod 184 within the dispensing module 18. The double-acting multi-piston air cylinder actuator 20 depicted in the preferred embodiment shown in FIG. 12 includes an air cylinder housing 320 with a rear end cap 322. A radially outward peripheral air channel 324 extends to a rear chamber 326 and front chamber 328 defined by an intermediate sealed partition wall member 330. A pair of pistons including a front piston 332 and a rear piston 334 are disposed one in each chamber 328 and 326, respectively, within the air cylinder housing 320 which are interconnected by means of a connecting rod which is sealably but slidably received through a centrally located orifice 338 provided in the intermediate partition wall member 330. Extending forwardly from the front piston element 332 is an actuator rod 340 connecting the double pistons 332 and 334 to the valving rod 184 of the foam dispenser module 18 by means of a threaded push/pull nut 342. The threaded push/pull nut 342 may be fine-tuned by rotating the coupling nut forward or back along the threaded end section of the actuator rod 340 to provide any necessary fine adjustment in the stroke length of the valving rod 184 on actuation.

Figure 12:
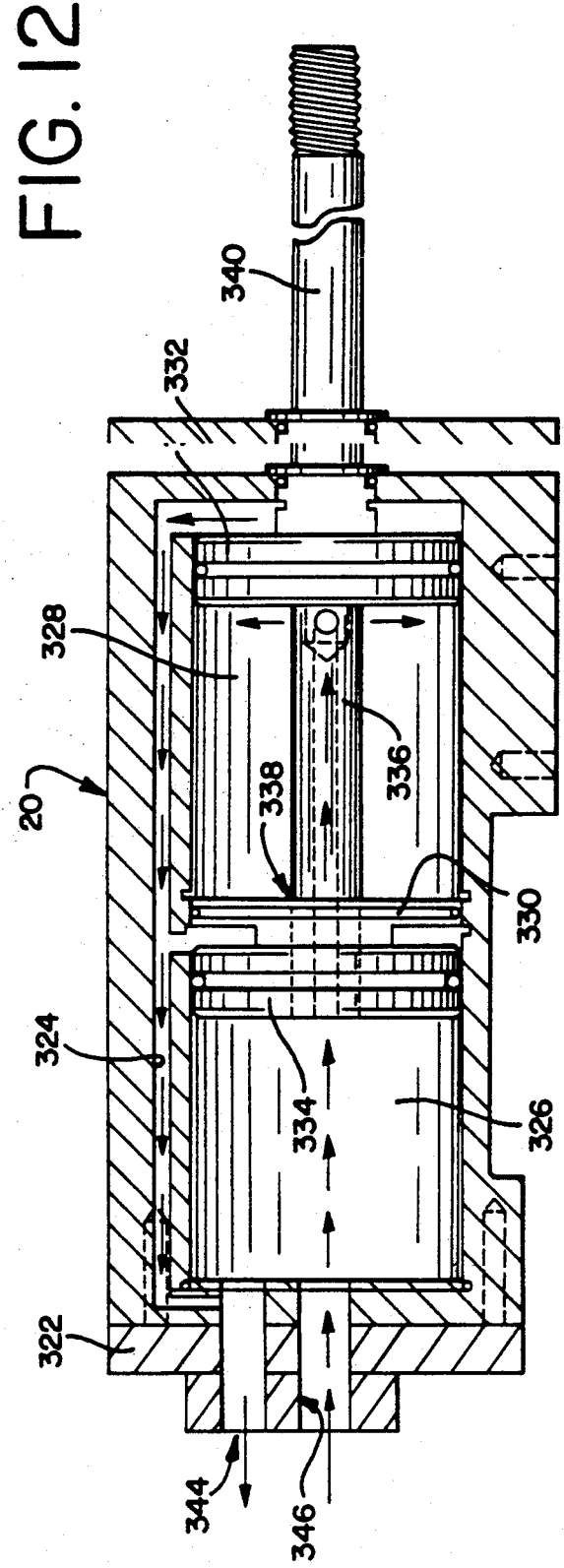
FIG. 12 is an elevated cross-sectional view of the preferred air cylinder and piston activator assembly of the present invention for moving the valving rod between its open and closed positions in the dispensing module.

The operation of the double-acting, double power air cylinder activator 320 may be understood with reference to FIG. 12 wherein the air flow is reversed so that air under pressure is now introduced through the upper cylinder port 344 and is directed along the peripheral radially outer passage 324 to exert pressure on the front faces of both pistons 332 and 334 simultaneously. This action pushes both pistons 332 and 334 rearwardly (leftwardly as shown in FIG. 12) within the cylinder housing 320 generating a double pull force under the same air pressure supply. The air supply being fed to the air cylinder may be controlled by a number of controller mechanisms. In the preferred thermal insulation dispensing applications, controlled time duration activations of the air cylinder and valving rod are used to dispense controlled amounts of uniform foam to a target area. In these contexts, the preferred activation mechanism will include an electronic trigger 30 connected to a power supply and mounted on the gun body with a depressible trigger button thereon which sends an electronic signal to a control box 34 including clock timing circuit which activates an air solenoid valve directing it from its normal position corresponding to the closed extended position of the air cylinder pistons and the valving rod with air having entered the rear portion of each chamber 326,328 behind each piston 332,334 forcing them forwardly within their chambers within the housing 320 and switching it to a second position wherein the incoming air power is directed to the upper port 344 and outer air passageway 324 to direct incoming pressurized air to the front surface of each piston 332,334 to cause a sustained retraction of the pistons within the air cylinder assembly causing the dispensing valve to open to dispense substantially uniform foam for a controlled amount of time whereupon the solenoid air valve is actuated back to the original closed position to close the valve in an appropriate timed sequence. Although electronic trigger and activators are preferred for use herein, other alternatives may suggest themselves to those skilled in this art. For example, a four-way manual air valve may be mounted on the gun to provide a manual air actuation system for controlling the double-action multi-piston air cylinder for controlling the movements of the valving rod within the valving assembly.

Each of the above-mentioned patents and applications is specifically incorporated herein by reference in its entirety.

Although the present invention has been described with reference to a preferred embodiment incorporating a combination of all of the beneficial improvements provided in accordance with the teachings of this invention, modifications or changes may be made therein by those skilled in this art. For example, the new and improved extended use life dispenser module may be used independent of the double-acting multi-piston air cylinder, the unitary socket member nd the converter subassembly. Similarly, the pressure balanced combination provided by the converter subassembly and the unitary socket member may be used with different dispenser cartridges activated by different air cylinders. Other combinations of these improvements will suggest themselves to those skilled in the art. All such obvious modifications or changes may be made herein without departing from the scope and spirit of the present invention as defined by the appended claims.

What is claimed is:

1. A hand held gun for dispensing a reactive chemical foam composition, said gun comprising, in combination:
a gun body including a handle, a unitary socket member mountable onto said gun body including a dispenser module receptacle portion having a pair of spaced and opposed component exit ports, a pair of opposed component entry ports spaced from said receptacle portion, a pair of spaced and opposed chemical component passageways defined in said socket member, each said passageway extending between and interconnecting a said component entry port to a said component exit port, respectively; said gun further including a removable dispenser module including a front end surface having a foam dispense opening, a rear end surface having a rod-receiving opening and an elongate central core aperture extending therethrough between said foam dispense opening and said rod-receiving opening and a pair of side openings, said dispenser module further including an elongate valving rod having a forward end portion slidably and sealingly engaged in the core aperture of the dispenser module, said valving rod being movable between a forward, closed position wherein the forward end portion extends within the foam dispense opening and along the length of said core aperture and a retracted, open position wherein the forward end portion is spaced rearwardly from said foam dispense opening and said side openings thereby permitting chemical components of said reactive chemical foam composition to flow through said component exit openings in said socket member, through said side openings, into said core aperture for impingement mixing and out through said foam dispense opening, said gun further including means for mounting the dispenser module in position within the receptacle portion of the socket member so that the side openings of the module are disposed in abutting registration with the component exit ports of the socket member, means for forming a fluid tight seal between the component exit ports and said side openings when said dispenser module is mounted in position in the receptacle portion of the socket member, means for sealingly connecting said component entry ports of said socket member to inbound sources of said chemical components under pressure and means for moving the valving rod between said open and said closed positions.

2. A gun as defined in claim I, wherein said means for forming said fluid tight seal comprises a radially outer, concentric O-ring groove disposed in said receptacle portion about each said component exit port and a compressible O-ring disposed in said groove and positioned to be deformably, sealingly compressed between abutting surfaces of said dispenser module and said receptacle portion of said socket member.

3. A gun as defined in claim 1, wherein said component entry ports of said socket member are disposed rearwardly from said receptacle portion and are each spaced laterally outwardly on opposite sides of said gun body.

4. A gun as defined in claim 1, wherein said component entry ports of said socket member each include a threaded cylindrical end portion adapted to sealingly, telescopingly, and threadedly receive a complementary threaded coupling member.

5. A gun as defined in claim 4, wherein complementary coupling member comprises a threaded check valve coupling member.

6. A gun as defined in claim 1, wherein a cross-sectional diametrical dimension of each said chemical component passageway is gradually reduced and tapered from said component entry ports to said component exit ports.

7. A gun as defined in claim 1, wherein each said chemical component passageway has a generally L-shaped configuration including a generally right angle bend therein at a point intermediate the length thereof.

8. A gun as defined in claim 7, wherein each said chemical component passageway additionally includes valve means disposed therein for turning the flow of chemical components through the passageway on and off as desired.

9. A gun as defined in claim wherein the means for connecting said component entry ports to said sources of said chemical components under pressure comprise hoses.

10. A gun as defined in claim further comprising means for converting each of said sources of inbound chemical components from high pressure inbound component streams of variable component quantity and flow rate to relatively lower pressure inbound component streams of substantially uniform, metered component quantity and flow rate, each said converter means being sealingly disposed in-line intermediate the respective sources of each said chemical component and the component entry port for said component in said socket member.

11. A gun as defined in claim 10, further comprising pressure balancing means disposed between said converter means and said core aperture effective to provide a pressure of each of said inbound controlled, metered component streams sufficient to obtain substantially thorough impingement mixing of said components in said core aperture of the dispenser module.

12. A gun as defined in claim 10, wherein each said converter means comprises a fixed flow, pressure-compensated flow controller device.

13. A gun as defined in claim 10, further comprising means for preventing reverse flow of chemical component materials from said chemical component exit ports toward said sources of inbound chemical components, said reverse flow preventing means being disposed intermediate a said converter means and an adjacent component entry port.

14. A gun as defined in claim 10, wherein said dispenser module comprises: a substantially rigid elongate housing having a peripheral sidewall, a said front discharge end with said foam discharge opening, an opposed rear end with a rear opening, an elongate central bore defined in said housing extending between said front discharge end and said rear opening and a pair of module side entry ports extending through said peripheral sidewall at a point intermediate said front discharge end and said rear end in fluid communication with said central bore, said dispenser module further including a valving assembly including a front elongate thermoplastic insert member having a front end surface with said foam dispense opening, a rear end surface with a rear opening and having a channel extending therethrough between said foam dispense opening and said rear opening, said channel defining a forward portion of said central core aperture, the foam dispense opening of said front insert member having substantially the same configuration and dimensions as said foam discharge opening, said valving assembly further including a rear elongate thermoplastic insert member having a front end surface with a front opening, a rear end surface with a rear opening, and a channel extending therein between said front and rear openings and defining a rearward portion of said central core aperture, said rear insert member further including said pair of side openings defined therein and communicating with said rear insert channel, said valving assembly further including a front scraper ring with a central rod scraping opening and a rear scraper ring with a rod scraping opening and a back up end cap including said rod-receiving opening and means for securing the end cap in position in the rear end of said housing, said front insert member, front scraper ring, rear insert member and rear scraper ring being telescopically and press-fittingly engaged in said housing central bore so that the front end surface of the front insert abuts the front discharge end of the housing and the foam dispense opening is disposed in registration with the foam discharge opening, said front scraper ring is disposed in abutting engagement between the rear end of the front insert member and the front end of the rear insert member, said side openings in said rear insert member are disposed in sealed fluid tight registering relation with said module side entry ports, said rear scraper ring is disposed in abutting engagement between the rear end of the rear insert member and said back up end cap, said valving assembly further including a highly polished hardened steel valving rod disposed in a slidable interference fit relationship within said front insert channel, said front scraper ring rod scraping opening, said rear insert channel, and said rear scraper ring rod scraping opening, said valving rod also being disposed in slidable relationship within said rod-receiving opening and means for applying a static axial load on the rear scraper ring in fully assembled dispenser module.

15. A gun as defined in claim 14, wherein the front insert member of the valving assembly has an axial length dimension defined between its front end surface and its rear end surface, said front insert member further including a stepped outer surface configuration having a stepped shoulder defined along said outer surface at a point intermediate the length of the front insert member thereby defining a forward minor cross-sectional configuration portion extending rearwardly front said front end surface to said stop shoulder and a rearward major cross-sectional configuration portion extending rearwardly from said shoulder to said rear end surface, said rearward major cross-sectional configuration portion being press-fittingly engaged in said core aperture, said forward minor cross-sectional configuration portion permitting expansion and relaxation of the front and rear inserts in said valving assembly upon reciprocating movement of the valving rod through the valving assembly to avoid cold flow induced failures in said dispenser module in use.

16. A gun as defined in claim 1, wherein said dispenser module comprises: a substantially rigid elongate housing having a peripheral sidewall, a said front discharge end with said foam discharge opening, an opposed rear end with a rear opening, an elongate central bore defined in said housing extending between said front discharge end ad said rear opening and a pair of module side entry ports extending through said peripheral sidewall at a point intermediate said front discharge end and said rear end in fluid communication with said central bore, said dispenser module further including a valving assembly including a front elongate thermoplastic insert member having a front end surface with said foam dispense opening, a rear end surface with a rear opening and having a channel extending therethrough between said foam dispense opening and said rear opening, said channel defining a forward portion of said central core aperture, the foam dispense opening of said front insert member having substantially the same configuration and dimensions as said foam discharge opening, said valving assembly further including a rear elongate thermoplastic insert member having a front end surface with a front opening, a rear end surface with a rear opening, and a channel extending therein between said front and rear openings and defining a rearward portion of said central core aperture, said rear insert member further including said pair of side openings defined therein and communicating with said rear insert channel, said valving assembly further including a front scraper ring with a central rod scraping opening and a rear scraper ring with a rod scraping opening and a back up end cap including said rod-receiving opening and means for securing the end cap in position in the rear end of said housing, said front insert member, front scraper ring, rear insert member and rear scraper ring being telescopically and press-fittingly engaged in said housing central bore so that the front end surface of the front insert abuts the front discharge end of the housing and the foam dispense opening is disposed in registration with the foam discharge opening, said front scraper ring is disposed in abutting engagement between the rear end of the front insert member and the front end of the rear insert member, said side openings in said rear insert member are disposed in sealed fluid tight registering relation with said module side entry ports, said rear scraper ring is disposed in abutting engagement between the rear end of the rear insert member and said back up end cap, said valving assembly further including a highly polished hardened steel valving rod disposed in a slidable interference fit relationship within said front insert channel, said front scraper ring rod scraping opening, said rear insert channel, and said rear scraper ring rod scraping opening, said valving rod also being disposed in slidable relationship within said rod-receiving opening and means for applying a static axial load on the rear scraper ring in fully assembled dispenser module.

17. A gun as defined in claim 14, wherein said front and rear insert members comprise a self-lubricating thermoplastic polymer composition.

18. A gun as defined in claim 17, wherein said polymer composition comprises a polytetrafluoroethylene thermoplastic polymer composition.

19. A gun as defined in claim 14, wherein said backup end cap is threadedly engaged in said rear opening with said valving rod extending therethrough, said end cap including means for lubricating said valving rod disposed the rear end of said central bore and external means for receiving and supplying additional lubricant to said lubricating means disposed on an inside portion of said end cap and the rear end of the housing.

20. A gun as defined in claim 14, wherein said front discharge end of said housing includes a forwardly projecting cylindrical portion having a front discharge surface and said foam discharge opening is defined in said front discharge surface.

21. A gun as defined in claim 20, further including a foam discharge guide tube telescopically received on said projecting cylindrical portion of the front discharge end of the housing.

22. A gun as defined in claim 21, further including means for mounting an end of said foam discharge guide tube onto said projecting cylindrical portion of the front discharge end of the housing.

23. A gun as defined in claim 22, wherein said front discharge surface of said forwardly projecting cylindrical portion includes at least one air aperture defined therein communicating with an air duct and said gun further includes means for introducing a flow air under pressure into said air duct and out through said air aperture into said foam discharge guide tube to purge any previously discharged foam out of said guide tube.

24. A gun as defined in claim 23 including four said air apertures equally spaced in the front discharge surface of the projecting cylindrical portion.

25. A gun as defined in claim 1, wherein said means for moving the valving rod between said open and said closed positions comprises an air cylinder having at least one reciprocatable piston disposed therein, means defining an air circuit for operating said at least one piston, trigger means for controlling the air circuit and piston, and means for connecting said at least one piston to said valving rod.

26. A gun as defined in claim 25, wherein said air cylinder comprises a double acting multi-power air cylinder having a plurality of reciprocatable pistons disposed therein adapted for simultaneous concerted movement under control of said air circuit.

27. A hand held gun for discharging a mixture of two chemically reactive components, said gun being adapted to direct said components to an impingement mixing passage in which said components are mixed immediately prior to discharge, and wherein said components are substantially simultaneously admitted to said mixing passage under the control of a single valving rod, said gun comprising, in combination, a gun body including a handle, a trigger, an air cylinder and a reciprocable piston disposed therein, means defining an air circuit for operating said piston, means for connecting said piston to a dispenser valving assembly, said gun further including a removable dispenser valving assembly and means for mounting said dispenser valving assembly to said gun body, said dispenser valving assembly including at least one valve body member having a front end with a foam dispense opening, a rear end with a rod-receiving opening, a pair of product component inlet ports, a cylindrical sidewall defining an impingement mixing passage extending through said valve body between said foam dispense opening and said rod-receiving opening, and a valving rod slidably received in and movable through said passage in fluid tight relation therewith and reciprocally movable in said passage between a forward, closed position wherein the valving rod extends within the foam dispense opening and along the length of said passage, and a retracted, open position wherein the valving rod is spaced rearwardly from said foam dispense opening and said component inlet ports thereby permitting chemical components to flow into said passage for impingement mixing and out through said foam dispense opening, means on said valving rod for cooperation with said piston connection means to provide removable connection therewith, said valving rod being made from a hardened tool steel and said valving assembly further including means for scraping the valving rod during reciprocal movements thereof to reduce foam build up induced failures in said valving assembly.

* * * * *